United States Patent [19]

Seiger et al.

[11] 4,292,143

[45] Sep. 29, 1981

[54] METHOD OF MAKING SINTERED PLAQUE NICKEL ELECTRODES

[75] Inventors: Harvey N. Seiger; Vincent J. Puglisi, both of Waterford, Conn.

[73] Assignee: Yardney Electric Corporation, Pawcatuck, Conn.

[21] Appl. No.: 126,640

[22] Filed: Mar. 3, 1980

Related U.S. Application Data

[63] Continuation of Ser. No. 967,652, Dec. 8, 1978, abandoned, which is a continuation of Ser. No. 856,381, Dec. 1, 1977.

[51] Int. Cl.$^3$ .................... H01M 10/44; C25D 11/00
[52] U.S. Cl. ...................................... 204/2.1; 204/24; 204/56 R
[58] Field of Search ................... 204/2.1, 24, 56 R, 96

[56] References Cited

U.S. PATENT DOCUMENTS 2,969,414  1/1961  Fleischer ............................. 204/2.1
3,507,699  4/1970  Pell ..................................... 204/2.1
3,827,911  8/1974  Pickett ................................ 204/2.1

OTHER PUBLICATIONS

Journal of the Electrochemical Society, vol. 94, Jul.–Dec. 1948, pp. 289–299.

*Primary Examiner*—T. M. Tufariello
*Attorney, Agent, or Firm*—Donald E. Nist

[57] ABSTRACT

The improved method of the invention comprises electrochemically depositing nickel hydroxide into the pores of a clean sintered nickel plaque cathode from heated aqueous electrolyte at acid pH in a treating zone containing an anode, while minimizing corrosion of the plaque. The electrochemical deposition is continued only until a loading level of about 2 grams per cubic centimeter of void volume in the plaque is obtained. This is in order to avoid thickening, swelling and stressing of the plaque. The method is carried out without the need for a wetting agent in the electrolyte. The plaque should be sufficiently clean so as to be readily wetted throughout by the electrolyte. Such a clean condition can be produced by heating the plaque to at least about 700° C. Plaque corrosion is minimized by polarizing the plaque cathode as by the use of a sacrificial cadmium cathode. Plaque corrosion can also be minimized by maintaining an electric current in the electrolyte whenever the plaque is present therein. It is preferred to carry out the deposition while applying a substantially constant level of current to the electrodes. Loading levels of nickel hydroxide in excess of 7.7 ampere hours per cubic inch can be effected for an improved product.

11 Claims, No Drawings

METHOD OF MAKING SINTERED PLAQUE NICKEL ELECTRODES

This is a continuation of application Ser. No. 967,652, abandoned; filed Dec. 8, 1978, which is a continuation of application Ser. No. 856,381, filed Dec. 1. 1977.

BACKGROUND OF THE INVENTION

Prior Art

Nickel electrodes made for long lived nickel-cadmium alkaline batteries and the like desirably exhibit high energy density and a high percentage of active material. Typically, such nickel electrodes are formed by impregnating porous sintered nickel bodies known as plaques with active nickel material, that is, nickel hydroxide. A well-known deposition procedure consists of filling the pores of the plaque with an aqueous solution of nickel-bearing salts or with molten nickel salt, usually with the aid of a vacuum. The nickel-bearing salt is then converted in the pores of the plaque to nickel hydroxide by treatment with an alkaline solution. This procedure requires a number of repetitions in order to build up the level of nickel hydroxide within the pores to a concentration which makes the product commercially acceptable. If the plaque is allowed to corrode, the number of repeats of the procedure is decreased but the plaque structure is weakened.

Kandler in U.S. Pat. No. 3,214,355 carried out the impregnation procedure in an electrochemical mode. Kandler used room temperature treatment which did not result in sufficient ultimate impregnation to make a successful nickel product. Meuller (U.S. Pat. No. 3,203,879) carried out the electrochemical deposition from a molten salt. Pell and Blossom in U.S. Pat. No. 3,507,699 disclosed an electrochemical process using an acidic aqueous solution of nickel nitrate at elevated temperatures to provide loading levels up to about 7.7 AH/in.$^3$ of plaque, equal to or greater than the best loading levels previously produced.

It would be desirable to find a way of improving the method of Pell and Blossom so as to further increase the loading levels obtainagle therefrom while decreasing plaque corrosion and improving control of the level of impregnation. It is also important to substantially limit the thickening and stressing of the plaque which normally occurs at high loading levels. Such a technique should result in improving the overall plaque quality, while reducing its variability, decreasing its sensitivity during processing to temperature fluctuations and increasing its maximum loading level.

SUMMARY OF THE INVENTION

The foregoing needs have all been satisfied by the improved method of the present invention. The method is substantially as set forth in the Abstract above. Thus, the method comprises electrochemical deposition of nickel hydroxide into the pores of a clean sintered nickel plaque cathode from heated acidic aqueous electrolyte while minimizing the corrosion of the plaque. The deposition is continued until a loading level of about 2 gm/cc of void volume is obtained. Such a high loading level is provided without substantial thickening, swelling and stressing of the plaque.

No wetting agent need be added to the electrolyte. Instead, the plaque is sufficiently clean when immersed in the electrolyte so as to be thoroughly wetted by the electrolyte. This clean condition can be obtained by carefully preserving the plaque from contamination after it is formed by sintering or by subjecting a dirty plaque to a temperature of at least about 700° C. to clean it. Electrochemical cleaning can be also utilized.

The electrolyte comprises an aqueous mixture of nickel nitrate and cobalt nitrate maintained at an acid pH of about 3 or less by nitric acid and at a temperature of about 70° to 90° C. during the electrochemical deposition. Plaque corrosion in this corrosive environment is minimized, in accordance with the present method, by polarizing the plaque; for example, by utilizing a sacrificial cadmium cathode along with the plaque cathode. However, such plaque corrosion is preferentially minimized by assuring that the plaque cathode is present in the electrolyte only when an electric current is being passed through the electrolyte.

It is preferred to conduct the deposition utilizing a fairly constant level of current. As set forth in the Abstract, a loading level of nickel hydroxide of about 2 gm/cc of void volume in the plaque is obtained before the deposition is discontinued. This assures that the loading level will be high but that the nickel plaque cathode being impregnated will not substantially swell or thicken and will not be unduly stressed. Stressing, swelling and thickening reduce the useful life of the cathode and have other disadvantages, including the requirement of additional processing to place the plaque into usable form. At a low current density, for example, of about 0.55 amps/in.$^2$ of plaque, the desired loading level is usually reached in about 90 minutes or so. Generally, the lower the current density, within reason, the higher the loading level that can ultimately be achieved and be tolerated without degrading the plaque quality. Normally, the loading level should not exceed about 2.1 gm/cc of void volume because values in excess thereof result in stressing, swelling and thickening of the plaque.

The present improved method is simple and relatively rapid and does not require repetition in order to achieve high loading levels of nickel hydroxide in the nickel plaque electrode. The deposited materials exhibit a utilization which is in excess of one (1) faraday/mole of material. The quality of the nickel plates is substantially improved over conventional plates made in accordance with conventional electrochemical impregnation techniques. Thus, the nickel plates produced by the present method are unstressed, strong and solid and have improved loading levels and are of uniform quality throughout. Further advantages of the present method are set forth in the following detailed description.

DETAILED DESCRIPTION

In accordance with the present method, nickel hydroxide is electrochemically deposited in the pores of a nickel plaque from a heated electrolyte at acid pH. The plaque can be formed in a conventional manner by sintering and typically has a porosity of about 78% about 86%. The electrolyte in the electrodeposition process comprises nickel nitrate in aqueous solution, with a minor concentration, for example, about 10 percent, by weight of the nickel nitrate, of cobalt nitrate. The nickel nitrate may be in any suitable concentration, for example, about 2-4 M. The solution is maintained at a pH of usually about 3 or less through the use of a suitable acid, preferably nitric acid. The porous nickel plaque is the principal cathode while the anode can be nickel or any inert material, for example, platinum plated titanium. A sacrificial cathode in the form of cadmium may be included in the system in order to protect the nickel plaque. Preferably, protection against corrosion is obtained by immediately cathodizing the plaque.

The electrolyte during the electrochemical deposition is preferably maintained at a temperature of about 70°-90° C., although other temperatures can be used. Current is applied through the electrolyte and electrodes in order to accomplish the desired deposition of nickel hydroxide. During such electrochemical deposition, ammonia is produced within the pores of the plaque and the pH rises. Thus, the nitrate ions in solution in the electrolyte are reduced to ammonia, with concurrent production of hydroxide ions. When the pH of the solution in the plaque pores reaches 8, nickel hydroxide quantitatively precipitates in the plaque. When the pH of such solution further increases to 13.5, the partial pressure of the ammonia gas formed in the plaque pores becomes sufficient to expel the exhausted solution from the plaque pores. As this ammonia gas reaches the electrolyte, it dissolves in the electrolyte and creates a vacuum within the pores. The vacuum forces fresh electrolyte into the plaque pores so that precipitation of the nickel hydroxide in the plaque pores begins again.

It has been calculated that the described precipitation reaction occurs automatically at least six times, and usually up to 10 times or more, in order to raise the amount of nickel hydroxide in the pores to the desired level of about 2 gm./cc. of void volume. The time utilized to impregnate the nickel plaque with the nickel hydroxide to the desired extent is usually of the order of about one-half hour to one and one-half hours. Such impregnation during the electrochemical deposition occurs almost linearly until the loading level approximates 2 gm./cc. of void volume. It has been found that when the plaque is loaded to the high level of about 2 gm./cc. of void volume, its loading is more uniform throughout the plaque than if a lower loading level, for example, of 1.5 gm./cc. were used. However, if the deposition is allowed to continue past the about 2 gm./cc. level, the deposition becomes non-linear, the plaque thickens and some of the nickel hydroxide is deposited on the outer surfaces of the plaque rather than within the voids of the plaque, weakening the plaque and requiring considerable processing to remove. Such thickening of the plaque shortens the plaque life, causes a change in the impedance of the cell and forces electrolyte redistribution, as well as wasting time and power.

The time necessary to carry out the impregnation of the nickel plaque in order to reach a certain loading level can be calculated when the void volume of the plaque is known and the current density has been selected. Usually, low current densities are preferred. The equation for this calculation is as follows:

$$t_{(hours)} = 0.768 \frac{\text{void volume} \times \text{loading level}}{\text{current density}}.$$

In a series of tests it has been found that, for example, when the nickel hydroxide impregnation is carried out at about pH 2, 80° C. and a current density of about 0.55 amps/in.$^2$, a loading level in the nickel plaque of about 2 gm./cc. of void volume can be reached in about 60 minutes, with a thickening of the plaque not in excess of about 1 mil or about 4% of the thickness of the plaque. Prior art methods normally cause plaque thickening of about 25% to about 50% while providing lower loading levels.

It has also been found that the impregnation time is essentially independent of the amount of plaque being impregnated, so long as there is an adequate supply of the electrolyte.

In carrying out the electrochemical deposition procedure, it is important to assure that a nickel plaque electrode is used which is sufficiently clean at the beginning of the procedure so that it is easily and thoroughly wetted by the electrolyte. Either a nickel plaque can be kept in that condition after it has been formed or it can be brought back to that clean condition by heating it to at least about 700° C. and then allowing it to cool before it is used in the present method as the cathode. Thus, the necessity of any wetting agent such as that sold under the name Carbowax, a registered trademark of Union Carbide Company, is eliminated with a consequent saving in cost and an increase in process efficiency.

Moreover, it is also desirable to decrease the corrosion of the nickel plaque in the hot corrosive electrolyte so as to minimize weakening of the plaque. This can be accomplished either by using a sacrificial cadmium cathode along with the nickel plaque cathode or, preferentially, by assuring that whenever the nickel plaque cathode is present in the electrolyte, an electric current is flowing through the electrolyte, which current may be equal to or less than the polarizing current.

It has been found to be of importance to utilize a constant current during the electrodeposition in order to control the uniformity of the impregnation throughout the plaque. Moreover, a low current density is desired during the electrochemical deposition in order to maximize the ultimate loading level without excessive thickening of the plaque. As the current density decreases to, preferably, below about 1 A/in.$^2$, the processing time necessary to reach a given high loading level increases, but the maximum desirable loading level also increases.

The following specific examples further illustrate certain features of the present invention:

EXAMPLE I

An electrolyte comprising an aqueous solution containing 40 kilograms of nickel nitrate [Ni (NO$_3$)$_2$.6H$_2$O] and 4 kilogams of cobalt nitrate [Co (NO$_3$)$_2$. 6H$_2$O] and no wetting agent is acidified with nitric acid to a pH of about 1.5, then heated to about a temperature of 80° C. This heated electrolyte is then used in a volume in an electrochemical deposition tank containing a clean porous sintered nickel plaque cathode having the following dimensions: 5.6"×2"×0.023". The cathode has a void volume of 0.298 cc/in.$^2$. A small cadium cathode (0.5 in.×5 in.×0.030 in.) is placed next to the nickel plaque cathode in the tank and two (2) nickel plates are used as the anode and are electrically interconnected with the cathodes. Before introduction into the electrolyte, the nickel plaque is tested to assure that it is clean. Thus, a small portion of it is immersed in a dish containing the electrolyte and it is noted that the remainder of the plaque wets rapidly, uniformly and evenly by capillarity.

A current having a density of about 0.8 A/in.$^2$ is imposed on the electrochemical deposition system in order to effect the electrochemical deposition of nickel hydroxide in the pores of the nickel plaque. The impregnation is continued for 60 minutes in order to obtain a loading level of about 2.0 gm./cc. of void volume in the plaque. Swelling of the plaque is less than about 4 percent. The plaque exhibits improved uniformity of impregnation throughout, improved strength and improved electrical properties, including capacity. Moreover, it has an improved longevity in use, in comparison with conventional sintered plaque nickel hydroxide-filled cathodes.

EXAMPLE II

The method of Example I is carried out, except that the anode comprises platinum plated titanium. The cadmium cathode is absent and, instead, in carrying out the procedure, the nickel plaque cathode is present in the electrolyte only when the current is flowing through the electrolyte. This is to assure minimal corrosion of the nickel plaque cathode. The pH of the electrolyte is approximately 4. The temperature of the electrolyte is about 90° C. and the impregnation is carried out at about 0.8 A/in.$^2$ current density for about 60 minutes in order to provide a loading level of 2 gm./cc. of void volume, with a swelling of the plaque of only about 2 percent. Thus, an improved nickel plaque electrode is obtained comparable in properties to that obtained in Example I. Neither the procedure of Example I nor that of Example II has to be repeated to obtain the desire results.

Various modifications, changes and alterations and additions can be made in the method of the present invention, its steps and parameters. All such modifications, changes, alterations and additions as are within the scope of the appended claims form part of the present invention.

What is claimed is:

1. An improved single step method of making sintered plaque nickel electrodes, said method comprising the single step of uniformly electrochemically depositing nickel hydroxide from a a heated aqueous alcohol-free electrolyte at a substantially constant current and a current density not in excess of about 1 A/in$^2$ (2.2 A/cc of void volume) into the pores of a clean sintered nickel plaque cathode at acid pH in a treating zone containing an anode, the deposition being continued only until the loading level of said nickel hydroxide throughout said sintered nickel plaque electrode reaches a uniform level not in excess of about 2 gm/cc of void volume, thereby avoiding thickening and swelling of the plaque cathode in excess of about 4%, the electrochemical deposition time being defined by the equation $$t_{(hours)} = 0.768 \frac{\text{void volume} \times \text{loading level}}{\text{current density}}.$$

2. The improved method of claim 1 wherein said electrolyte is free of wetting agent additive.

3. The improved method of claim 1 wherein said sintered nickel plaque cathode is sufficiently clean so as to be readily wetted throughout by said electrolyte.

4. The improved method of claim 3 wherein said sintered nickel plaque cathode has been cleaned by heating to at least about 700° C.

5. The improved method of claim 2 wherein said electrolyte comprises a mixture of nickel nitrate and cobalt nitrate maintained at an acid pH of about 1-3 by nitric acid and wherein said temperature is about 70°-90° C.

6. The improved method of claim 1 wherein said plaque cathode corrosion is minimized by polarizing said plaque cathode.

7. The improved method of claim 6 wherein said polarization is effected by utilizing a sacrificial cadmium anode.

8. The improved method of claim 1 wherein said plaque cathode corrosion is minimized by maintaining an electrical current in said electrolyte while said plaque cathode is present therein.

9. The improved method of claim 8 wherein said electrical current is maintained at all times while said plaque cathode is present in said electrolyte.

10. The improved method of claim 5 wherein said anode comprises nickel.

11. The improved method of claim 9 wherein the loading level of nickel hydroxide effected by said electrochemical deposition is in excess of about 7.7 AH/in$^3$.

* * * * *